(12) United States Patent
St. John-Larkin

(10) Patent No.: US 9,774,890 B2
(45) Date of Patent: Sep. 26, 2017

(54) INCREMENTAL TRANSMISSION OF DATA

(71) Applicant: Echostar Technologies L.L.C., Englewood, CO (US)

(72) Inventor: David Christopher St. John-Larkin, Denver, CO (US)

(73) Assignee: ECHOSTAR TECHNOLOGIES L.L.C., Englewood, CO (US)

(*) Notice: Subject to any disclaimer, the term of this patent is extended or adjusted under 35 U.S.C. 154(b) by 239 days.

(21) Appl. No.: 14/610,908

(22) Filed: Jan. 30, 2015

(65) Prior Publication Data
US 2015/0143407 A1 May 21, 2015

Related U.S. Application Data

(60) Division of application No. 13/903,851, filed on May 28, 2013, now Pat. No. 8,978,089, which is a (Continued)

(51) Int. Cl.
*H04N 5/445* (2011.01)
*H04N 21/234* (2011.01)
(Continued)

(52) U.S. Cl.
CPC ...... *H04N 21/23424* (2013.01); *H04H 20/42* (2013.01); *H04N 5/783* (2013.01); *H04N 21/235* (2013.01); *H04N 21/2365* (2013.01); *H04N 21/2387* (2013.01); *H04N 21/2393* (2013.01); *H04N 21/26216* (2013.01); *H04N 21/435* (2013.01); *H04N 21/4331* (2013.01); *H04N 21/4347* (2013.01); *H04N 21/4405* (2013.01); *H04N 21/4623* (2013.01); *H04N 21/6143* (2013.01); *H04N 21/6581* (2013.01); *H04N 21/6587* (2013.01); (Continued)

(58) Field of Classification Search
CPC .......... H04N 21/262; H04N 21/26208; H04N 21/26216; H04N 21/26266; H04N 21/458
See application file for complete search history.

(56) References Cited

U.S. PATENT DOCUMENTS 5,774,170 A 6/1998 Hite et al.
6,271,893 B1 * 8/2001 Kawaguchi et al. ......... 348/725
(Continued)

FOREIGN PATENT DOCUMENTS

EP 1225717 A2 7/2002

OTHER PUBLICATIONS

International Search Report for corresponding International Application No. PCT/US2007/087289, mailed Oct. 22, 2008, 1page.

*Primary Examiner* — John Schnurr
(74) *Attorney, Agent, or Firm* — Seed IP Law Group LLP

(57) ABSTRACT

In one form, the present teachings provide a method and apparatus for broadcasting an event. The method includes receiving data related to an event via an uplink. Another aspect of the method includes determining whether the data is broadcast on a recurring basis. The method also includes determining whether a transponder channel associated with multiplexed program channels has any unused data or bandwidth to broadcast a portion of the data along with the multiplexed program channels. Additionally, the method includes broadcasting the portion of the data in a data stream.

20 Claims, 4 Drawing Sheets

Related U.S. Application Data continuation of application No. 11/966,668, filed on Dec. 28, 2007, now Pat. No. 8,458,750.

(60) Provisional application No. 60/882,896, filed on Dec. 29, 2006.

(51) Int. Cl.
| | |
|---|---|
| *H04H 20/42* | (2008.01) |
| *H04N 21/235* | (2011.01) |
| *H04N 21/2365* | (2011.01) |
| *H04N 21/239* | (2011.01) |
| *H04N 21/262* | (2011.01) |
| *H04N 21/433* | (2011.01) |
| *H04N 21/434* | (2011.01) |
| *H04N 21/435* | (2011.01) |
| *H04N 21/4405* | (2011.01) |
| *H04N 21/4623* | (2011.01) |
| *H04N 21/61* | (2011.01) |
| *H04N 21/658* | (2011.01) |
| *H04N 21/81* | (2011.01) |
| *H04N 5/783* | (2006.01) |
| *H04N 21/2387* | (2011.01) |
| *H04N 21/6587* | (2011.01) |
| *H04H 20/40* | (2008.01) |
| *H04H 60/06* | (2008.01) |

(52) U.S. Cl.
CPC ......... *H04N 21/812* (2013.01); *H04N 21/814* (2013.01); *H04N 21/8146* (2013.01); *H04H 20/40* (2013.01); *H04H 60/06* (2013.01)

(56) References Cited

U.S. PATENT DOCUMENTS

| | | |
|---|---|---|
| 7,453,843 B2 | 11/2008 | Mowery et al. |
| 7,587,736 B2 | 9/2009 | Summers et al. |
| 7,653,921 B2 | 1/2010 | Herley |
| 7,712,121 B2 | 5/2010 | Horn et al. |
| 7,770,198 B1 | 8/2010 | Greene |
| 8,745,656 B2 * | 6/2014 | Rodriguez et al. ............ 725/32 |
| 2002/0138831 A1 | 9/2002 | Wachtfogel et al. |
| 2002/0194592 A1 | 12/2002 | Tsuchida et al. |
| 2003/0046711 A1 | 3/2003 | Cui et al. |
| 2004/0268410 A1 | 12/2004 | Barton et al. |
| 2006/0031892 A1 * | 2/2006 | Cohen ............................ 725/88 |
| 2006/0236346 A1 | 10/2006 | Luccisano |
| 2007/0089127 A1 * | 4/2007 | Flickinger et al. ............ 725/32 |
| 2007/0266400 A1 | 11/2007 | Rogers et al. |
| 2008/0195743 A1 | 8/2008 | Brueck et al. |

* cited by examiner

INCREMENTAL TRANSMISSION OF DATA

CROSS-REFERENCE TO RELATED APPLICATION

This application is a divisional of U.S. application Ser. No. 13/903,851, filed on May 28, 2013, now allowed, which is a continuation of U.S. patent application Ser. No. 11/966,668, filed Dec. 28, 2007, now U.S. Pat. No. 8,458,750, which claims benefit under 35 U.S.C. §119(e) to U.S. Provisional Patent Application No. 60/882,896, filed Dec. 29, 2006, which applications are hereby incorporated by reference in their entirety.

BACKGROUND

Technical Field

The present invention generally relates to a method for transmitting data, and more particularly to a method for incrementally broadcasting video and/or audio data to a recipient.

Description of the Related Art

Many conventional home satellite television systems utilize a fixed dish antenna to receive satellite communications. After receiving a satellite signal, the dish antenna sends a satellite spectrum signal to a satellite receiver or set-top box, often located near a user's television. The satellite receiver sends the satellite signal to the television through which the user can view the satellite program. A typical satellite generally includes 32 transponder channels between 950 MHz to 2150 MHz, with each transponder channel carrying a number of different program channels. Each transponder channel supports a predetermined bandwidth or a maximum data capacity that can be outputted to the satellite receiver. Based on the bandwidth capabilities, each transponder channel will typically transmit multiple programs events or program channels that are time-multiplexed or frequency multiplexed on a carrier signal.

Compression techniques are often used to transport digital data streams. One example of a common compression technique for digital video transmission is a Motion Picture Experts Group 2 (MPEG-2) video compression standard. For digital video broadcasts using the MPEG-2 compression standard, another MPEG compression standard or any other such standard, data for a plurality of channels may be time-multiplexed onto a signal transport stream. For satellite digital video broadcasts, each of the transport streams may correlate to a transponder channel. In addition, the satellite broadcaster may select the transponder channel into which one or more transport streams are multiplexed based, at least in part, upon the amount of the data or bandwidth needed to transmit each channel. For example, transmissions of news broadcast events often require relatively low amounts of bandwidth because the scenes and or backgrounds typically do not change significantly. In contrast, transmissions of sporting events often require relatively large amounts of bandwidth because the video scenes may constantly change at a fast rate. In addition, within a single program event, the data requirements may change significantly depending upon the image being broadcast. Thus, in general, satellite broadcasters as well as other types of broadcasters of digital video transmissions (e.g., digital cable, digital terrestrial), will typically analyze the current data transmission requirements of their programs and attempt to optimize their transport streams by adjusting the channels that are multiplexed together.

Oftentimes, however, optimal utilization of the bandwidth for a transponder channel is not achieved. One reason for this is that methods for transmitting data often broadcast recurring or the same data over a network multiple times in a predetermined period of time. The term "network," as used herein, generally refers to any transmission scheme, medium, apparatus or setup capable of sending a signal from at least one originator (or "broadcaster" as used herein) to at least one recipient. Exemplary networks include the Internet, Ethernet, World Wide Web, local area networks, wide area networks, wired networks, wireless networks (including wireless networks propagating, receiving or initiating Bluetooth, infrared, radio frequency, and/or ultra-high frequency transmissions). The afore-described methods of broadcasting recurring data may consume unnecessary bandwidth that could be used to transmit other data to users, or may fail to fully exploit all available bandwidth of a transponder channel. Therefore, there is a need for a method and a system to transmit recurring data once to a user in order to optimize performance of a bandwidth in a network system.

BRIEF SUMMARY

One embodiment of the present invention takes the form of a method for broadcasting data. The method includes receiving data that is generally transmitted several times to a user within a predetermined period of time. The method also includes determining an amount of available bandwidth for transmitting the data. Another aspect of the method includes partitioning the data into a plurality of segments based on the available bandwidth and transmitting the segments of the data in a data stream over a period of time, such that the data is transmitted to a user only once and stored prior to the data being needed for use by the user.

Another embodiment of the present invention takes the form of an apparatus for transmitting data. The apparatus includes a first transponder channel configured for receiving data that is generally transmitted several times to a user within a predetermined period of time. The apparatus may also include a control module coupled to the plurality of transponder channels and configured to receive the data. The control module determines an amount of available bandwidth in each of the plurality of transponder channels for transmitting the data, the control module partitions the data into a plurality of segments based on the available bandwidth. The second transponder channel is configured to transmit the plurality of segments of the data in a data stream over a period of time, such that the data is transmitted to the user only once and stored prior to the data being needed for use by the user.

Still another embodiment of the present invention takes the form of a method for receiving transmitted data. The method includes receiving a first segment of data in a first data stream. The method also includes receiving a second segment of the data in a second data stream. Another aspect of the method includes assembling the first segment and the second segment of the data to form assembled data for storage prior to the assembled data being needed for use by a user until the assembled data is triggered to be retrieved and transmitted for use by a user, wherein the data is transmitted to the user only once.

Yet another embodiment of the present invention takes the form of an apparatus for receiving transmitted data. The apparatus includes a control module configured to receive a first segment of data in a first data stream and receive a second segment of the data in a second data stream. The control module assembles the first segment and the second segment of the data to form assembled data for storage prior to the assembled data being needed for use by a user until the assembled data is triggered to be retrieved and transmitted. The data is received only once by the control module. The apparatus may also include a monitor coupled to the control module and configured to receive the assembled data for viewing by the user.

Another embodiment of the present invention takes the form of a method for transmitting and receiving data. The method includes receiving data from a source. The method also includes determining whether the data is generally sent to a user on a recurring basis within a period of time. Still the method may also include transmitting recurring data once, such that the recurring data is partitioned in a first segment and a second segment and transmitted over a period of time to a receiver. Another aspect of the method may also include receiving the first segment and the second segment to be reassembled for storage prior to being needed for use by the user.

Further areas of applicability will become apparent from the description provided herein. It should be understood that the description and specific examples are intended for purposes of illustration only and are not intended to limit the scope of the present disclosure.

DETAILED DESCRIPTION

Figure 1:
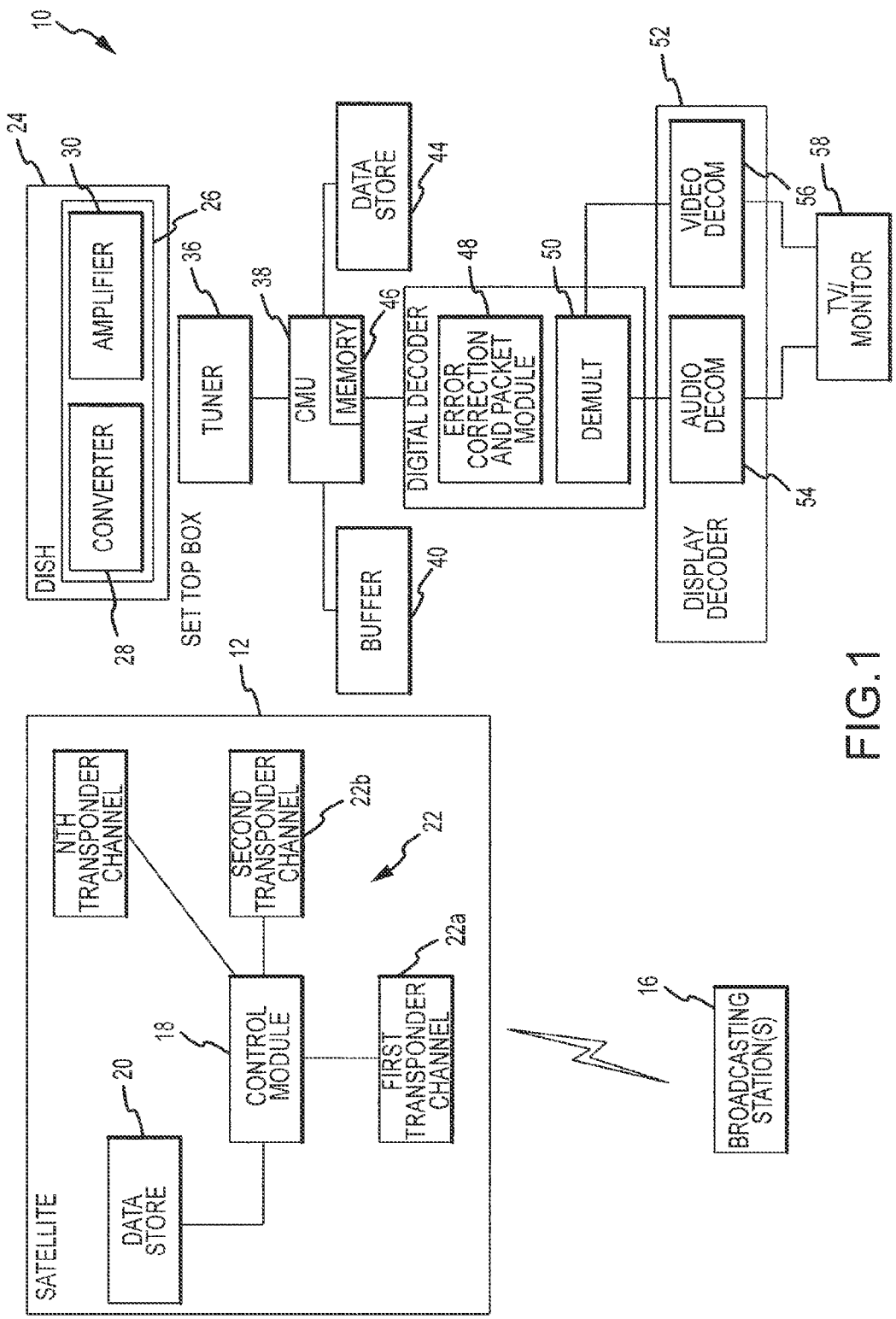
FIG. 1 is a block diagram illustrating one embodiment of the present invention.

With reference to FIG. 1, a system for incrementally transmitting data is constructed in accordance with the teachings of the present invention and is generally indicated by reference numeral 10. This system 10 allows a source to transmit data, which is typically sent multiple times ("recurring data"), once to a user within a predetermined time frame, such that the data is gradually or incrementally transmitted over a period of time to the user. A device associated with the user may store the data until the device is triggered to retrieve the data for use. Once recurring data is stored on the device, such an embodiment 10 allows the source to more efficiently employ the available transmission bandwidth to transmit more data and/or improve the quality of the data that is being transmitted to the user, because recurring data is transmitted a single time and therefore does not repeatedly consume transmission bandwidth. Additionally, this system 10 allows the user to store data prior to its being used or displayed and retrieve that data based on a predetermined trigger or event.

As used herein, the term "module" refers to an application specific integrated circuit (ASIC), electronic circuit, a processor (shared, dedicated, or group) and memory operative to execute one or more software or firmware programs, combinational logic circuit, or other suitable components (either hardware or software) that may provide the functionally described with respect to the module.

FIG. 1 is a schematic that shows in block form an exemplary embodiment of the present invention and related components used to transmit, receive and process data, such as video and audio information. The exemplary embodiment of FIG. 1 may utilize a direct broadcast satellite system 10 (DBS), which can incorporate packetized transmissions signals according to the Motion Picture Experts Group 2 (MPEG-2) standard. Further, the present invention may be used with any transmission source, such as off-air analog or digital terrestrial transmission, cable television (TV), or high-definition television (HDTV).

Additionally, with recent advances in telephony and computer data transmissions, it should be readily apparent that the present invention may also be used with other transmission sources, such as analog and digital transmission networks (including Switched Multimegabit Digital Service, Multiaccess Network, Internet connections, digital transmission lines, Synchronous Optical Network Technologies, Fiber optic Digital Data Interfaces, fiber optic networks, and/or Ethernet connections). The terms "broadcast" and "transmission" are generally used interchangeably herein. Likewise, although various embodiments are described with respect to a set-top box 14 receiving a transmission, it should be understood that in alternative embodiments different devices may likewise receive transmissions, including personal computers, mobile and handheld computing devices, notebook computers, mobile phones, personal digital assistants, audiovisual receivers and equipment, digital video recorders, and so forth. Accordingly, the term "set-top box" is meant to broadly represent the various devices capable of receiving transmissions or broadcasts as described herein.

Referring to FIG. 1, the DBS satellite system 10 includes a DBS satellite 12 and a satellite receiver or set-top box 14. The satellite 12 receives data from at least one broadcast station 16 and transmits that data to the set-top box 14. The set-top box 14, in turn, receives the data from the satellite 12 and converts the data into video and/or audio signals. Thereafter, the set-top box 14 sends the video and/or audio signals to a user's television for the user to view.

As shown in FIG. 1, the DBS satellite 12 may include a control module 18, data storage 20, and at least one transponder channel 22. More specifically, the DBS satellite 12 may include a plurality of transponder channels 22. The control module 18 is electrically coupled to the data storage and the plurality of transponder channels 22.

Each transponder channel 22 receives incoming data over a specific frequency range or band from the broadcasting communication station and retransmits the data on a different frequency or band. In doing so, each transponder channel 22 may receive and broadcast a plurality of program channels, such that the plurality of transponder channels 22 may broadcast well over 300 program channels. The data received by at least one of the transponder channels 22 may include video and/or audio data for one or multiple events or other instructions or commands for the operation or manipulation of the satellite 12. When a transponder channel 22 receives the data, it sends the data to the control module 18.

The control module 18 generally controls each of the plurality of transponder channels 22 and the data received via those transponder channels 22. When the data is received by the control module 18, it determines whether the data relates to an event or is other data. Data that relates to an event may include an event identifier. The event identifier is a unique identification that is assigned to every event, and it includes a specific name or title for the event. For example, the event identifier may include a general or specific title that describes the event. By analyzing the data for an event identifier, the control module 18 determines whether the data relates to an event or other data.

Data that relates to an event may also include an event category identifier, event type identifier, a prevention signal, and a program channel. The event category identifier may indicate a specific category for a specific event. For example, the categories may include a category such as movies, advertisements, news, drama shows, comedy sitcoms, etc. Each event category may also include subcategories. For example, a category for advertisement may include subcategories such as automotive, dish detergent, power tools, discount department stores, etc. Broadly, data relating to an event may be thought of as metadata, or data that is not part of the event itself but is associated therewith. Metadata may include any of the foregoing examples. Metadata may be broadcast on the same transponder channel as the event or on a different channel. Metadata may be received with the event or may be received prior to (or during or after) the event.

The event type identifier identifies a specific event as a program event, a miscellaneous event, or a recurring event. Program events are typically events that may be broadcast once to a viewer on a particular program channel, although they may be rebroadcast at a later date. Miscellaneous or recurring events are typically events that may be broadcast several times over a period of time on a corresponding program channel. The miscellaneous or recurring event may include, but is not limited to, advertisements, a scroll bar (such as news in data lines, stock exchange data, sports scores, etc.), a background for a show, or preselected downloaded movies. Hereinafter, these types of events will be referred to collectively as "miscellaneous events." Each program event or miscellaneous event requires a certain amount of bandwidth or data for the satellite 12 to broadcast the program event or the miscellaneous event in a data stream.

The event type identifier may include a "recurring" flag that indicates the associated event, or a portion of the associated event, is broadcast once and intended to be stored locally by a receiver such as the set-top box. The recurring flag may be set at either the broadcasting station or the control module 18. More specifically, when the flag is set (optionally at the satellite 12, but often at a terrestrial broadcaster or station uploading data to the satellite), it indicates that the event is a miscellaneous event that may be incrementally broadcast once to the set-top box 14. Otherwise, if the flag is not set, it indicates that the event is a program event.

In an alternative embodiment, the control module 18 may set the recurring flag. When data is identified as corresponding to an event, the control module 18 may copy and store the event identifier along with corresponding program channel information for a predetermined period of time. Additionally, the control module 18 may determine if the event has been broadcast more than a predetermined number of times within the predetermined period of time. For example, when the control module 18 receives an event, the control module 18 may compare the event identifier of the event to a stored copy of an event identifier of a previously received event. If the event identifier of the currently received event is the same as the stored copy of the event identifier, the control module 18 may set the recurring flag and incrementally broadcast the event. The control module 18 may discard other events received with the same event identifier until the predetermined period of time expires. After the predetermined period of time has expired, the control module 18 discards the stored copy of the event identifier.

In still another embodiment, the control module 18 (or set-top box) may keep track of the number of times it has received the same event identifier or event within a predetermined period of time. This may be done by comparing the event identifier of a recently received event to the event identifier of a previously stored event. If the event identifier of the recently received event matches the event identifier of the previously stored event a predetermined number of times, the control module 18 may set the recurring flag for the currently received event and incrementally broadcast the event on a selected transponder channel 22. Thereafter, any event received with the same event identifier may be discarded if it is received within the predetermined period of time.

The prevention signal is a status identifier that is assigned to an event to prevent a user from fast forwarding through or skipping portions or segments of an event. If the prevention signal is present, devices, such as a digital recording device, may disable fast forward or skipping through the event, ether during the transmission or during replay of a recorded event. Events with a prevention signal may include, but are not limited to, television commercials or advertisements, public service announcements, emergency broadcasts, and the like.

Additionally, a miscellaneous event may include an event trigger. The event trigger is an instruction that informs the set-top box 14 when the miscellaneous event should be retrieved from storage and transmitted for viewing by a user. The event trigger may indicate that a particular miscellaneous event should be played if the set-up box is tuned to a particular program channel at a predetermined time. For example, the event trigger may indicate that the miscellaneous event should be viewed on program channel 23 beginning at 1:30 p.m. on Dec. 23, 2006.

Alternatively, the event trigger may indicate that the miscellaneous event should be retrieved from storage and displayed by the set-top box if a particular program event is being viewed by the user. For example, if the miscellaneous event is a background or static image used for a particular program, such as a news show, the event trigger may include instructions to display the miscellaneous event to the user when the news is being viewed by the user. The event trigger may also indicate that a particular miscellaneous event should be viewed when a particular program event is associated with a specific event category identifier. For example, if the user is viewing a program event related to an action movie, the event trigger may include instructions to retrieve from storage and display a particular miscellaneous event with a category identifier equal to an advertisement for automotive vehicles.

A counter indicator may also be associated with a miscellaneous event. The counter indicator is also used by the set-up box, and identifies the number of times the event should be retrieved from storage and displayed for viewing by the user.

In addition to determining whether the incoming data relates to an event, the control module 18 may store any event related data in the data store 20. Using the event type identifier, the control module 18 may identify whether an event is a program event or a miscellaneous event. If the event is a program event, the control module 18 may determine which transponder channel 22 may broadcast a program channel with a particular program event. The selection of a transponder channel 22 is typically based on the amount of bandwidth needed to broadcast the program event for a predetermined period of time. Each transponder channel 22 is allocated a predetermined bandwidth. "Bandwidth" generally refers to the amount of data that can be transferred over a network in a fixed amount of time. The control module 18 may analyze bandwidth required for each program channel to transmit the program event. These requirements are compared to the bandwidth of each transponder channel 22 in order to determine which program channels can be multiplexed into a single data transport stream in order to optimize each data transport stream. The control module 18 multiplexes those channels which can be broadcast together within the bandwidth requirements.

The control module 18 may broadcast miscellaneous events at a predetermined time. For example, the control module 18 may broadcast miscellaneous events on a transponder channel 22 once a day or at set intervals. For example, the control module 18 may have a transponder channel 22 broadcast miscellaneous events at seven o'clock p.m. every day, or every hour. Further, in an embodiment transmitting miscellaneous event(s) at recurring periods, the event(s) may be transmitted across a different transponder channel each time they are sent. The control module 18 may determine which transponder channel has sufficient bandwidth to broadcast the miscellaneous event (or a portion thereof) when the miscellaneous event is to be transmitted. Depending on available bandwidth, the transponder channel may change from transmission to transmission.

Alternatively, the control module 18 may have a transponder channel 22 broadcast miscellaneous events any time a miscellaneous event is received by the control module 18. In some embodiments, the control module 18 may broadcast miscellaneous events whenever a transponder channel 22 has available bandwidth. In yet another alternative embodiment, the control module 18 may have a preset transmission identifier that indicates when a related miscellaneous event should be broadcast on a transponder channel 22.

If any one of the plurality of transponder channels 22 has bandwidth available, the control module 18 may multiplex the miscellaneous event with the program channels assigned to that transponder. To do so, the control module 18 retrieves the miscellaneous event from the data store 20. Based on the amount of unused or available bandwidth available on the particular transponder channel 22 to broadcast the miscellaneous event, the control module 18 partitions each available event into segments or portions for incremental broadcasting.

The control module 18 then partitions the miscellaneous event into segments, such as time segments and/or pixel segments. In other words, the control module 18 may partition the miscellaneous event into packets ("segments"), where each packet is transmitted in the available bandwidth of a transponder channel. Packets for a single event may be transmitted across different transponder channels. As one example, when partitioning the event into pixel segments, the control module 18 may partition the miscellaneous event based on a number of layers that an image of the miscellaneous event may be sent out in the available bandwidth.

In addition to partitioning the miscellaneous event, the control module 18 may assign segment or partitioning information to each segment of the miscellaneous event. The segment information may allow the partitioned miscellaneous event to be reassembled in a sequential order. For example, the segment information may include a sequence number for each segment or packet of the event and the event identifier.

The control module 18 may also determine which segment of the miscellaneous event to output to a selected transponder channel 22. This may be done based on the amount of data contained within a particular segment, such that a segment is selected when a particular transponder channel 22 has bandwidth or data in the data stream available to transmit the selected segment. The control module 18 may select a transponder channel 22 to broadcast the segments to in any random or specific order. For example, the control module 18 may select a transponder channel 22 to broadcast the segments in the sequential order using the sequence number, such as a first-in-first-out basis, or output the segments in any order based on the amount of available bandwidth for broadcasting.

The control module 18 different transponder channels 22 broadcast the segments of the miscellaneous event. More specifically, the segments of the miscellaneous event may broadcast in different data streams by different transponder channels 22 at the same time. For example, the control module 18 may send the first segment to a first transponder channel 22*a* and a second segment to a second transponder channel 22*b* at the same time. Alternatively, after a first segment has been broadcast in a first data stream, any remaining segments may be stored in the data store 20 and later retrieved to be transmitted by the same transponder channel 22 or a different transponder channel 22. For example, the control module 18 may send the first segment at time T to the first transponder channel 22*a* for broadcasting and the second segment at time T+1 to the first transponder channel 22*a* or the second transponder channel 22*b* for broadcasting.

In addition to having each segment of the partitioned miscellaneous event broadcast, the control module 18 may store a copy of each segment of the partitioned miscellaneous event along with its corresponding segment information. This data is stored in the data store 20 for a predetermined period of time. This allows the control module 18 to identify each segment of a particular miscellaneous event. This, in turn, may allow the control module 18 to rebroadcast any missing segments identified by the set-top box 14, if necessary. This data may be stored in the data store 20 and indexed by a related event identifier, event category identifier, transmission time, or any other suitable arrangement. For example, if the control module 18 receives a request signal from the set-top box 14 for one or several missing segments related to a particular miscellaneous event, it may employ a selected transponder channel 22 to rebroadcast the requested missing segments. The request signal from the set-top box may include at least the event identifier and the sequence number of the miscellaneous event. Using event identifier and the sequence number, the control module 18 selects a transponder channel 22 to broadcast the missing segments.

In some cases, the set-top box 14 may be required to display a miscellaneous event not yet received. When this occurs, in one embodiment the control module 18 may receive a request signal via a transponder channel 22 to immediately send a miscellaneous event in its entirety. In this case, the control module 18 retrieves the copy of the stored miscellaneous event from the data store 20 and multiplexes the miscellaneous event onto a transponder channel having sufficient bandwidth for transmission to the set-top box 14. Alternatively (if, for example, no transponder channel 22 has sufficient available bandwidth to transmit the miscellaneous event), the control module 18 may have a transponder channel 22 broadcast a low-bandwidth version of the miscellaneous event, if available. As yet another alternative, a temporary placeholder may be retrieved or generated by the set-top box and shown in lieu of the miscellaneous event.

Each transponder channel 22 carries selected multiplexed program channels and may also carry at least one segment of a miscellaneous event. A transponder channel generally transmits the selected multiple program channels and the segment of the miscellaneous event that are time-multiplexed on one carrier signal. In one embodiment, the selected multiplexed program channels and the segment of the miscellaneous event are broadcast as encrypted direct satellite DBS signals, ranging from approximately 12.2 GHz to approximately 12.7 GHz, that are received by the set-top box 14.

More particularly, the selected multiplexed program channels and the segment of the miscellaneous event are downlinked signals from a satellite antenna or parabolic dish 24 that is coupled to the set-top box 14. Front end processing of the satellite signal is often accomplished by a low noise block down converter feed (LNBF) 26 provided at the antenna focal point. This includes a converter module 28 with a low noise amplifier 30 that receives the signals from the antenna 24 and by means of the block down converter converts the entire frequency band of satellite signals to a lower, intermediate frequency range of approximately 0.95 to 2.15 GHz, which can be transmitted via coaxial cable 34 to the set-top box 14.

The set-top box 14 may receive one or more signals from the dish 24 via the cable 34. The set-top box 14 may include a tuner 36, a central module unit (CMU) 38, a buffer 40, a digital decoder, and a data store (or storage device). The tuner is electrically coupled to the CMU 38, which is in turn electrically coupled to the buffer 40, the digital decoder 42, and the data store 44.

The tuner 36 selects a specific frequency band or channel from the downlinked signal and demodulates the data stream into corresponding audio and/or video signals. The tuner outputs the corresponding audio and/or video signals to the CMU 38.

In addition to receiving the corresponding audio and/or video signals, the CMU 38 determines whether the signals correspond to a program event or a miscellaneous event. In order to do this, the CMU 38 may check the recurring flag to determine whether it has been set. If the recurring flag is not set, the signals may correspond as a program event. In response, the CMU 38 may determine whether to output the signals to the buffer 40 or the digital decoder 42 depending on the state of a delay program or flag. The delay flag may instruct the buffer 40 to delay the presentation of the broadcasting program information to a viewer. As an example, the delay flag may be set to prevent immediate display of a miscellaneous event scheduled for use or display at a later time. The delay flag has two states: enabled and disabled. If the delay flag is disabled, the CMU 38 transmits the signals to the digital decoder 42 without delay. If the state is enabled, the CMU 38 transmits the signals to the buffer 40 or storage device.

If the recurring flag is set, the signals may correspond to a miscellaneous event. In response thereto, the CMU 38 may store the signals in the data store 44 using the event identifier. Upon receiving signals related to a miscellaneous event, the CMU 38 may determine if all portions of the miscellaneous event have been received. In doing so, the CMU 38 may check the sequence numbers of each segment; a maximum or final sequence number may likewise be transmitted. Additionally, the CMU 38 may calculate the amount of data received, and compare the calculated data amount to a total expected data amount that may be transmitted to indicate the size of a miscellaneous event. If the calculated data amount and the total expected data amount are equal, all of the segments related to the miscellaneous event have been received. (In an alternative embodiment, the CMU 38 may determine if all segments of the miscellaneous event have been received.)

Each segment of the miscellaneous event is typically stored in the data store 44, which may be any form of storage, including magnetic, optical, volatile, flash programmable, and so on. As the CMU 38 continues to receive other segments of the miscellaneous event, the CMU 38 reassembles the partitioned miscellaneous event by arranging the received segments in order of sequence based on their corresponding sequence numbers. In certain embodiments, using the event identifier and the sequence numbers associated with a particular miscellaneous event, the CMU 38 checks each segment to determine that it has received at least the segment assigned the sequence number one, the segment end identifier, and each sequence number between the sequence number one through the sequence number that was identified with a corresponding segment end identifier. In addition, the CMU 38 continues to determine if all of the segments of the miscellaneous event have been received by the CMU 38 by checking the total data number.

If the CMU 38 determines that any sequence number associated with a particular event identifier for a partitioned miscellaneous event is missing, the CMU 38 may send a signal to the control module 18 of the satellite requesting one or several missing portions or segments of the miscellaneous event. If the CMU 38 has not received the requested segments with the corresponding missing sequence numbers within a period of time, the CMU 38 may discard from the data store 44 all of the segments related to that particular event identifier. Alternatively, the CMU 38 may wait a predetermined period of time to receive all of the segments of the miscellaneous event, and discard all of segments from the data store 44 related to that miscellaneous event after the expiration of the predetermined period of time. Still alternatively, the CMU 38 may retain those received segments and interpolate missing segment data from the received segments.

In addition to determining when all of the segments of a partitioned miscellaneous event have arrived, the control module 18 reassembles the segments of the partitioned miscellaneous event. More particularly, the control module 18 may reassemble the segments based on sequential order of the sequence numbers for a particular event. The control module 18 stores the reassembled miscellaneous event in the data store 44. Additionally, the control module 18 may reassemble the miscellaneous event such that a first segment is viewed by the viewer before a second segment is viewed. The control module 18 may also reassemble a first segment and a second segment of the miscellaneous event, such that the first segment and the second segment is displayed to the viewer at or about the same time.

The CMU 38 retrieves the video and audio signals corresponding to the reassembled miscellaneous event based on the event trigger. The event trigger indicates to the CMU 38 when a particular miscellaneous event is to be processed for viewing by the viewer. In other words, the event trigger tells the CMU 38 when to retrieve a particular miscellaneous event from the data store 44 and transmits the reassembled miscellaneous event to the buffer 40 or the digital decoder 42.

In another embodiment, the CMU 38 may set the event trigger based on operations of the CMU 38. More specifically, the CMU 38 may set the event trigger when the miscellaneous event is reassembled and the tuner is tuned into an associated program channel. The CMU 38 may also set the event trigger via a command input set by the user, using a remote or a keyboard, inputs an event trigger for a particular miscellaneous event. The remote control device sends a UHF or infrared signal to a remote receiver, which passes the desired command to the CMU 38. The keyboard, located on the set-top box 14, may also supply user commands to the CMU 38. Such that when the miscellaneous event is reassembled by the CMU 38, it requests a viewer to select from a particular event trigger from a list of event triggers for the particular miscellaneous event or a plurality of reassembled miscellaneous events.

If an event trigger is satisfied and all of the segments have not been received via the CMU 38 or the CMU 38 has not reassembled the segments, the CMU 38 may retrieve a previous stored temporary graphic. The CMU 38 may transmit the graphic to the digital decoder 42 or the buffer 40 based on the status of the delay program. Alternatively, the CMU 38 may send a request signal for a complete transmission or a low band-width transmission of the miscellaneous event to the satellite 12. This would allow the satellite 12 to immediately broadcast the miscellaneous event in its entirety or a low-bandwidth version of the miscellaneous event.

The CMU 38 may discard signals related to a particular miscellaneous event from the data store 44 for multiple reasons. As previously stated, the CMU 38 may discard all of the segments related to a particular event identifier, if the CMU 38 has sent the request signal and has not received the segments with the missing sequence numbers after a predetermined period of time. The CMU 38 may also discard all miscellaneous event data after a predetermined period of time from the data store 44. For example, the CMU 38 may delete all data related to a miscellaneous event every 24 hrs.

The CMU 38 may also time stamp each event identifier related to a miscellaneous event and discard the miscellaneous event based the time stamp. For example, the CMU 38 may time stamp a particular event identifier and discard all data associated with the event identifier after a predetermined period of time has lapsed. Additionally, the CMU 38 may discard the segments related to the particular event identifier for a miscellaneous event, once the CMU 38 has transmitted the miscellaneous event to either the buffer 40 or the digital decoder 42. This allows previously used data storage to become available for the storing of another miscellaneous event. The CMU 38 may also delete a particular miscellaneous event based on the counting indicator that may be associated with the miscellaneous event. If the miscellaneous event includes a counting indicator, the CMU 38 assigns a count to that miscellaneous event, such that each time the CMU 38 retrieves that miscellaneous event from the data store 44 and transmits it to either the buffer 40 or the digital decoder 42, the CMU 38 increments the count until it is equal to the counting indicator. At such time, the CMU 38 discards the segments of the miscellaneous event from the data store 44.

In response to the event trigger, the CMU 38 retrieves the reassembled miscellaneous event from the data store 44 and sends it to either the buffer 40 or the digital decoder 42. The buffer 40 is a storage device that may be organized as a queue having a head and a tail. The queue stores the signals in a first-in/first-out scheme, such that the demodulated audio and video signals are passed through the tuner to the tail, progress through the queue, and are routed from the head to the digital decoder 42. The buffer 40 may be implemented as one or more high speed hard disks, but any storage device that may be organized as a queue, which has a high storage capacity for audio and video signals, and which operates at acceptable speeds (e.g., solid state, magnetic, circuitry, optical) may be used.

If the delay program is enabled, the user may input play, rewind, fast-forward, pause, and deactivate command inputs to manipulate a time shifting of a selected event. A user supplies the command inputs to the CMU 38 via either the remote control device or the keyboard.

The CMU 38 outputs the signals to the buffer 40 in order to store at least one event or a portion of the event over a period of time. When the viewer inputs the pause command, the CMU 38 checks the buffer 40 to determine if the buffer 40 is full. If the buffer 40 is not full, the CMU 38 routes the signals to the tail of the buffer 40. If the buffer 40 is full, the stored signals are flushed from the head of the buffer 40 to allow storage from the incoming signals. When the play command is received from the viewer, the CMU 38 routes the signals stored in the head of the buffer 40 to the digital decoder 42 at normal speed for viewing. The incoming signals are delayed by being routed into the tail of the buffer 40, then passed through the buffer 40 to the digital decoder 42. If the fast forward command is provided by the viewer, the CMU 38 determines whether the signals stored in the buffer 40 include the prevention signal. If so, the CMU 38 ignores the fast forward command. If not, the CMU 38 routes signals stored in the buffer 40 to the head of the buffer 40 to the digital decoder 42 at an accelerated rate. The result is that the output signals are displayed to the user at the accelerated rate. This allows the user to fast forward through undesired programming.

The digital decoder 42 may include an error correction and packet synchronization module 48 and packet demultiplexer 50. The error correction and packet synchronization module 48 combines a QPSK decoder and a Reed-Solomon and Viterbi forward error corrector. The QPSK decoder accepts the digital signals from the tuner and converts them to data and checksum bits corresponding to packets in the data stream. The forward error correction logic accepts the data and checksum bits and corrects errors that occurred in the transmission of the data stream. The error correction and data packet synchronization module may output a fully compliant MPEG-2 transport stream as defined by the ISO 13818 MPEG specification. Output from the error correction and packet synchronization module is directed to the packet demultiplexer.

The packet demultiplexer 50 is an integrated circuit that accepts the packetized, time domain multiplexed data stream of the MPEG-2 transport stream and routes the packets to various areas of the set-top box 14. Audio is output as an audio stream. Video is output as a video stream. The audio stream and the video stream can be fully compliant audio and video program elementary streams as defined by ISO 138-2 and ISO 13818-3 of the MPEG-2 standard, respectively. In addition to routing packets of data, packet demultiplexer also unscrambles encrypted data, provides buffering of the MPEG data, and maintains program clock reference handling to keep a local clock synchronized with a clock at the uplink center.

A display decoder 52 receives the video stream and audio stream from the digital decoder 42. The display decoder includes an audio decompressor 54 and a video decompressor 56, which decompress the video stream and audio stream, respectively, into digital signals. The display decoder 52 may also include a video digital to analog converter and an audio digital to analog converter to convert the digital signals into analog signals. The resulting base band analog signals are then sent to connectors located on the outside of the set-top box 14, which connects to a TV/monitor 58.

While the set-top box 14 receives direct broadcast satellite signals, other digital and analog broadcast signals in addition to, or instead of, satellite signals may be received by the set-top box or other devices in alternative embodiments of the invention. These audio/video sources may include, but are not limited to: Internet transmissions (including various Internet protocol transmissions, such as TCP/IP), HDTV signal, analog or digital terrestrial signal, analog or digital telephony signals, and so on.

Figure 2A:
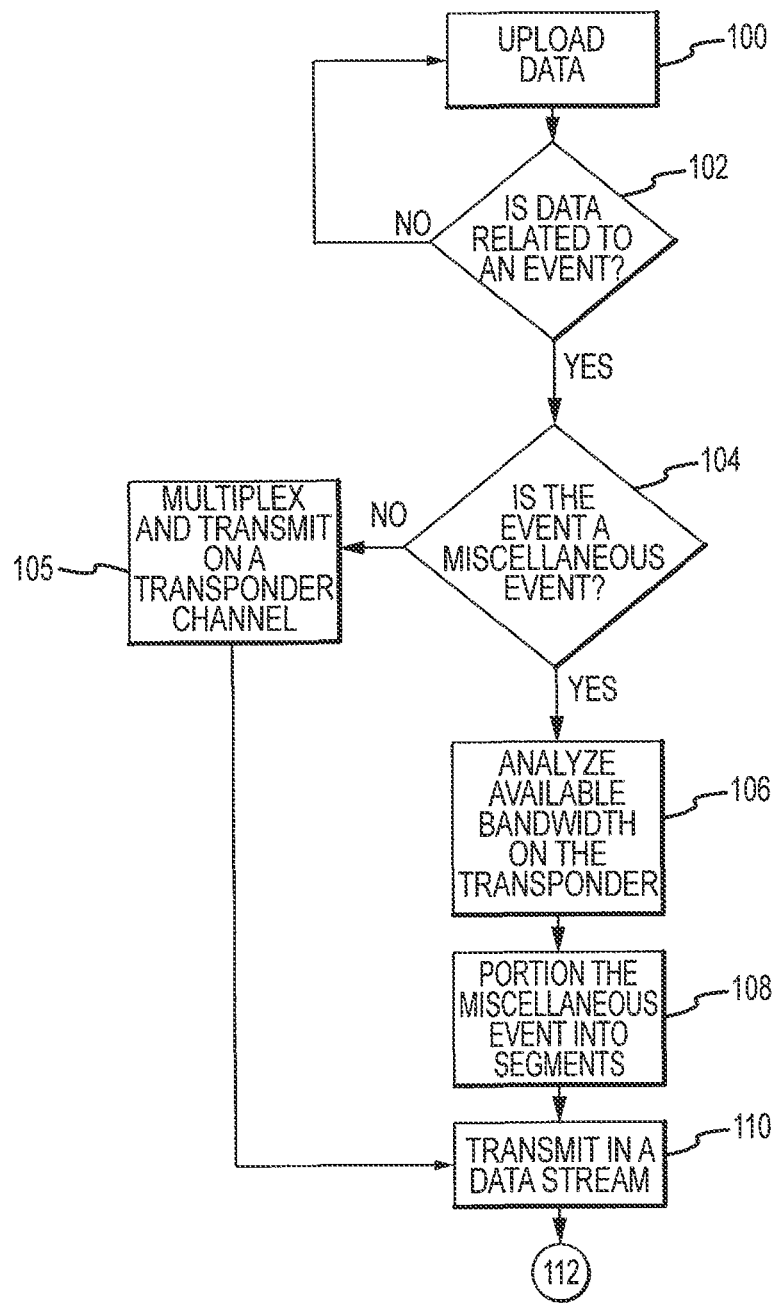
FIG. 2A is a flow diagram showing a sequence of operations permitting transmission of a signal in accordance with an embodiment of the present invention.
Figure 2B:
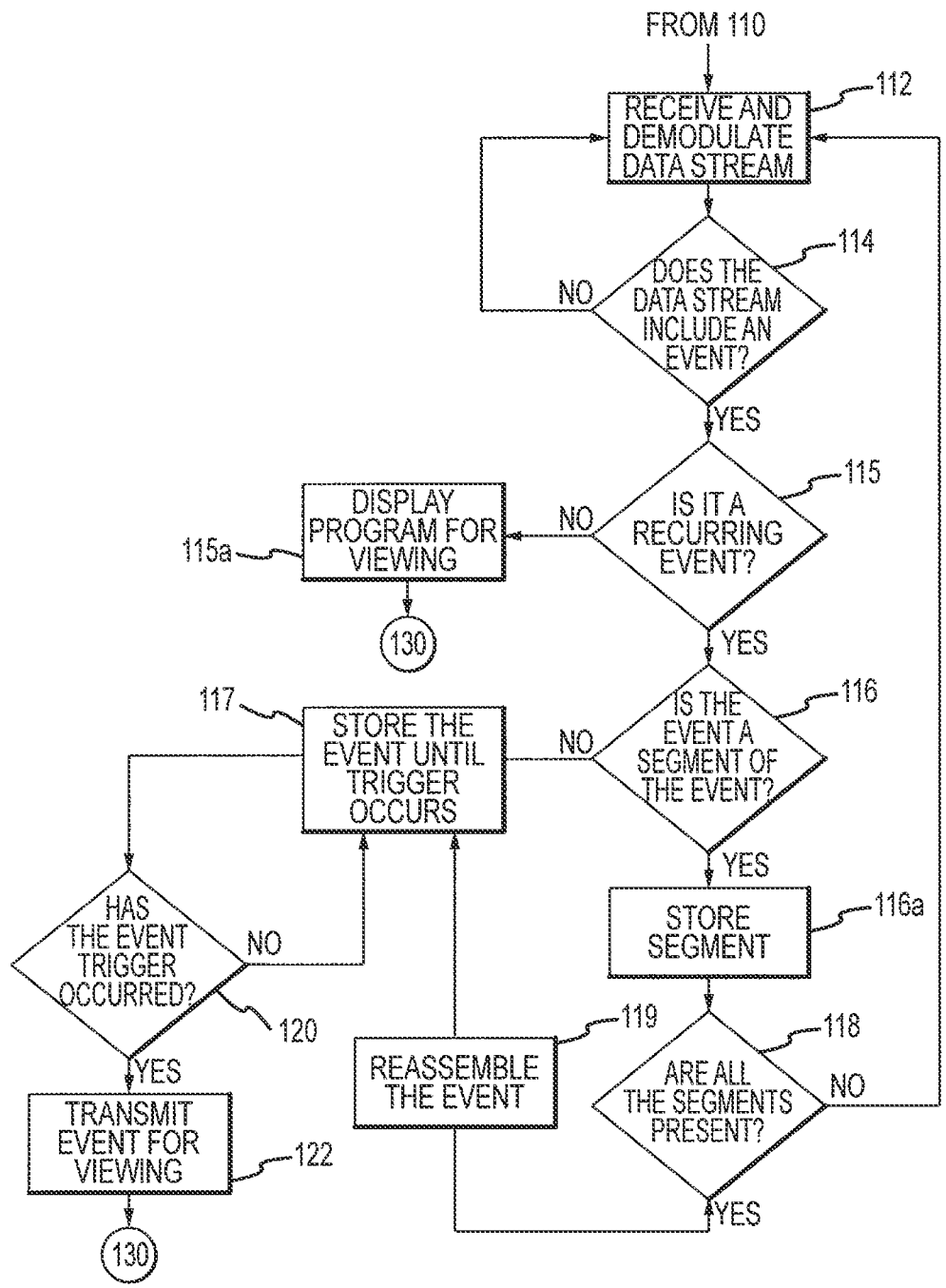
FIG. 2B is a flow diagram showing a sequence of operations for receiving and processing a signal in accordance with an embodiment of the invention.
Figure 2C:
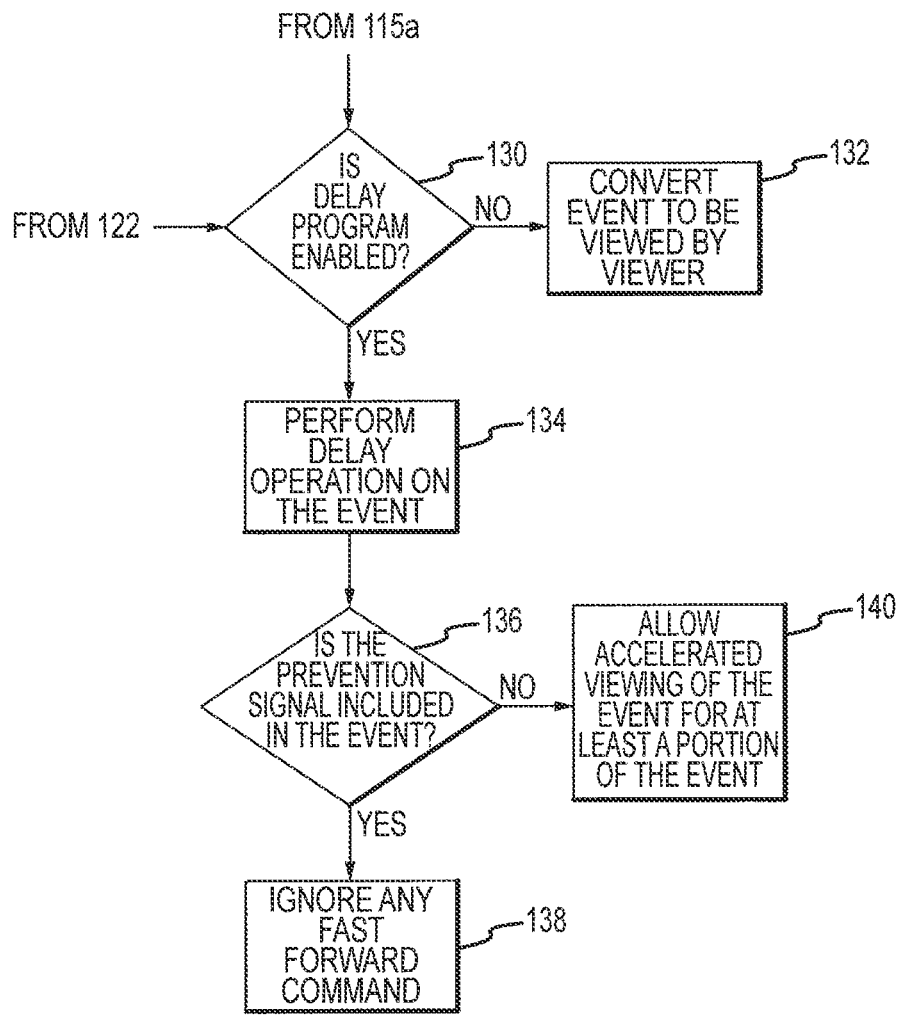
FIG. 2C is a continuation of the flow diagram of FIG. 2B.

Now turning to FIGS. 2A-2C, logical sequence of operations that may be performed by an exemplary embodiment of the present invention are disclosed. Beginning with operation 100 of FIG. 2A, data may be uploaded via an uplink from at least one broadcasting station to the satellite 12. The data is uplinked via at least one transponder channel 22 that sends it to the control module 18. In operation 102, the control module 18 determines whether the data corresponds to an event. If the data is not an event, then the embodiment returns to operation 100.

If the data corresponds to an event, the control module 18 determines whether the data is related to a miscellaneous (or recurring) event in operation 104. If the data is not related to a miscellaneous event, operation 105 is accessed and the program is then multiplexed with another program for transmission on a particular transponder. Following operation 105, the multiplexed programs are transmitted as a data stream on a transponder channel in operation 110.

If, however, the embodiment determines in operation 104 that the event is a recurring event, then operation 106 is accessed. In operation 106, the embodiment determines what bandwidth is available on at least one transponder channel and selects a transponder channel 22 having sufficient bandwidth to carry at least a portion of the recurring event.

Next, in operation 108 the embodiment partitions the miscellaneous event into one or more segments. The size of each segment may be arbitrary, based on the bandwidth available in the one or more transponder channels, or fixed. The embodiment may further multiplex the segment(s) with a program or program channel for transmission on a transponder channel 22.

Following operation 108, in operation 110 the embodiment transmits the multiplexed signal as a data stream on a transponder channel 22.

FIGS. 2B-2C generally depict a flowchart showing the receipt of a signal by a local device and the treatment of that signal in accordance with an exemplary embodiment of the present invention. In operation 112, the set-top box 14 receives and demodulates the data stream transmitted on a particular transponder channel. In operation 114, the CMU 38 of the set-top box 14 determines if the data stream includes an event. If not, then the CMU 38 continues to receive data streams and returns to operation 112. If so, the CMU 38 determines whether the event is a program event or a miscellaneous event by checking the recurring flag at operation 115. If not, operation 115a is accessed and the program is displayed for viewing unless a time shifting program is enabled. If the time shifting or delay operation is disabled, the set-up box (or other receiving device) converts the program event into appropriate signals for viewing and listening of the program event (or other storage of the event/data) by a viewer via a TV monitor and speakers. If the time shifting or delay operation is enabled, the set-up box performs the delay operation on the program event. When triggered via the viewer, the set-up box converts the program event into appropriate signals for viewing and listening of the program event in the delayed output for the viewer via the TV monitor and speakers.

Returning to operation 115, operation 116 is accessed if the event is recurring. In operation 116, if the event relates to a miscellaneous event, the CMU 38 determines whether the event received is a partition or segment of the miscellaneous event. If so, in operation 116a the CMU 38 stores the segment and waits to receive other portions of the miscellaneous event. If no, the CMU 38 stores the miscellaneous event for future use at operation 117. At operation 118, the CMU determines whether all of the segments have been received. If yes, the CMU 38 reassembles the miscellaneous event at operation 119 then proceeds to operation 116b.

At operation 120, if the event trigger has occurred, the CMU 38 retrieves the miscellaneous event and transmits it to either the buffer 40 or the digital decoder 42 in operation 122. Following operation 122, at operation 130, the CMU 38 determines whether the delay program has been enabled. If no, the CMU transmits the miscellaneous event and/or the program event to the viewer for converting the miscellaneous event and/or the program event into appropriate signals for viewing and/or listening by the viewer via the TV monitor and/or speakers at operation 132. If the delay operation is enabled, the set-up box performs the delay operation on the miscellaneous event at operation 134. When a play command is received from the viewer, the set up box converts the miscellaneous event into appropriate signals for viewing and listening of the miscellaneous event in a delayed output for the viewer via the TV monitor and/or speakers in operation. If the fast forward command is inputted by the viewer, the set-up box determines whether the data for the miscellaneous event includes a prevention signal in operation 136. In operation 138, if the prevention signal is included in the miscellaneous event, the set-up box ignores the fast forward command. If the prevention signal is not included in the miscellaneous data, the set-up box proceed with the fast-forward operation at the step 140.

There are several uses for the system 10 for incremental broadcasting. One such use allows data or events that are generally broadcast on a recurring basis to be broadcast once. Another option is that by using unallocated bandwidth space of a transponder channel 22, the miscellaneous data can be partitioned and broadcast over a period of time and reassembled before it is needed by a set-up box or receiving unit. Still another use is that miscellaneous event can be partitioned based on a given amount of pixels or time. In other words, a portion of the miscellaneous event corresponding to a specific amount of time can be sent in the available bandwidth. Likewise, a specific amount of pixels that corresponds to individual layers of an image can be sent by a particular transponder.

It should be understood that the operations described with respect to FIGS. 2A-2C are exemplary only. Alternative embodiments may add, omit, change the order of, or change the execution of one or more operations without departing from the spirit or scope of the invention. Likewise, although the invention has been described with respect to the display of a program or miscellaneous event, it may be applied to the transmission, storage, and presentation or use of any recurring data.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A method to communicate data, comprising:
receiving a plurality of segments of data over a period of time from a remote data transmission source, such that the data is received only once, a first segment of the plurality of segments having an associated first event identifier;
storing the plurality of segments of data prior to presenting the plurality of segments of data to an output port;
storing the first event identifier associated with the first segment;
presenting the plurality of segments of data to the output port;
receiving from the remote data transmission source a repeated event identifier identical to the first event identifier;
in response to receiving the repeated event identifier, retrieving the first segment corresponding to the associated first event identifier; and
presenting the first segment of data to the output port.

2. The method of claim 1, further comprising:
discarding segments of the plurality of segments of the data that are not associated with at least one event identifier after said unassociated segments are presented to the output port; and
discarding segments of the plurality of segments of the data that are associated with at least one event identifier after a determined period of time has elapsed since said associated segments were presented to the output port.

3. The method of claim 2, further comprising:
requesting retransmission of at least one segment of the plurality of segments of the data.

4. The method of claim 1 wherein the first segment corresponding to the first event identifier is a recurring segment of data.

5. The method of claim 4 wherein the recurring segment of data is at least one portion of a commercial.

6. The method of claim 1, further comprising:
receiving a command to fast forward or skip at least one segment of data; and
forcing a normal presentation to the output port of a miscellaneous segment of the plurality of segments of the data when the miscellaneous segment includes a prevention signal.

7. A non-transitory memory operative to execute one or more software or firmware programs, the one or more software or firmware programs configured to carry out a method, the method comprising:
receiving a plurality of segments of data over a period of time, each segment individually identified;
receiving a command to store a recurring segment of data, the recurring segment of data being one of the received plurality of segments of data;
storing the recurring segment of data;
storing a recurring event identifier associated with the recurring segment of data;
outputting the plurality of segments of data including the recurring segment of data;
later receiving an event identifier corresponding to the recurring event identifier;
in response to the later received event identifier, retrieving the recurring segment of data; and
re-outputting the recurring segment of data.

8. The non-transitory memory operative to execute one or more software or firmware programs of claim 7, the one or more software or firmware programs configured to carry out a method, further comprising:
after the plurality of segments of the data are output, discarding the plurality of segments of the data except for the recurring segment of data.

9. The non-transitory memory operative to execute one or more software or firmware programs of claim 8, the one or more software or firmware programs configured to carry out a method, further comprising:
after a determined period of time has elapsed since re-outputting the recurring segment of data, preventing further outputting of the recurring segment of data unless the recurring segment of data is re-received.

10. The non-transitory memory operative to execute one or more software or firmware programs of claim 8, the one or more software or firmware programs configured to carry out a method wherein preventing the re-outputting of the recurring segment of data is by discarding the recurring segment of data or discarding the recurring event identifier.

11. The non-transitory memory operative to execute one or more software or firmware programs of claim 8, the one or more software or firmware programs configured to carry out a method, further comprising:
after a determined number of times the re-outputting the recurring segment of data has occurred, preventing further outputting of the recurring segment of data unless the recurring segment of data is re-received.

12. The non-transitory memory operative to execute one or more software or firmware programs of claim 8, the one or more software or firmware programs configured to carry out a method, further comprising:
requesting retransmission of at least one segment of the plurality of segments of the data.

13. The non-transitory memory operative to execute one or more software or firmware programs of claim 7, the one or more software or firmware programs configured to carry out a method wherein the recurring segment of data is at least one portion of a commercial.

14. The non-transitory memory operative to execute one or more software or firmware programs of claim 7, the one or more software or firmware programs configured to carry out a method, further comprising:
receiving a prevention signal associated with at least one segment of data of the plurality of segments of data;
receiving a command to fast forward or skip at least one undesired segment of data; and
preventing the fast forward or skip when the at least one undesired segment of data is associated with the received prevention signal.

15. A receiving device, comprising:

an output port;

a memory configured to store a plurality of segments of data including a recurring segment of data prior to the plurality of segments of data and the included recurring segment of data being presented to the output port, the memory further configured to store a recurring event identifier associated with the recurring segment of data; and a control module configured to process the plurality of segments of data including the recurring segment of data as said segments of data are received from a remote data transmission source, wherein processing said segments of data includes directing the presentation of said segments of data to the output port, the control module further configured to process a repeated event identifier later received from the remote data transmission source, wherein processing said later received repeated event identifier includes directing the representation of said recurring segment of data to the output port.

16. The receiving device of claim 15 wherein processing the plurality of segments of data includes discarding the plurality of segments of data except for the recurring segment of data after directing the presentation of said segments of data to the output port.

17. The receiving device of claim 16 wherein processing the plurality of segments of data includes discarding the recurring segment of data after a determined period of time has elapsed since directing the re-presentation of said recurring segment of data.

18. The receiving device of claim 15 wherein processing the plurality of segments of data includes discarding the recurring segment of data after a determined number of times the re-presentation of said recurring segment of data has occurred.

19. The receiving device of claim 15 wherein the recurring segment of data is at least one portion of a commercial.

20. The receiving device of claim 15 wherein the control module is further configured to process a prevention signal associated with at least one segment of data of the plurality of segments, the control module is further configured to process a command to fast forward or skip at least one undesired segment of data, and the control module is further configured to prevent the fast forward or skip when the at least one undesired segment of data is associated with the received prevention signal.

* * * * *